United States Patent
Bala et al.

(10) Patent No.: US 10,530,837 B2
(45) Date of Patent: Jan. 7, 2020

(54) ALWAYS-ON MONITORING IN THE CLOUD

(71) Applicant: International Business Machines Corporation, Armonk, NY (US)

(72) Inventors: Vasanth Bala, Rye, NY (US); Canturk Isci, Secaucus, NJ (US); Todd W. Mummert, Danbury, CT (US); Sahil Suneja, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1337 days.

(21) Appl. No.: 14/249,487

(22) Filed: Apr. 10, 2014

(65) Prior Publication Data
US 2015/0295800 A1    Oct. 15, 2015

(51) Int. Cl.
| | |
|---|---|
| H04L 29/08 | (2006.01) |
| H04L 29/06 | (2006.01) |
| G06F 9/455 | (2018.01) |
| H04L 12/26 | (2006.01) |
| H04L 12/24 | (2006.01) |

(52) U.S. Cl.
CPC .......... H04L 67/10 (2013.01); G06F 9/45558 (2013.01); H04L 43/14 (2013.01); H04L 63/20 (2013.01); H04L 67/2809 (2013.01); H04L 67/2819 (2013.01); H04L 67/38 (2013.01); G06F 2009/45591 (2013.01); H04L 41/5009 (2013.01)

(58) Field of Classification Search
CPC ........ H04L 43/08; H04L 65/608; H04L 67/10
USPC ....................................... 709/224
See application file for complete search history.

(56) References Cited

U.S. PATENT DOCUMENTS

| | | | | |
|---|---|---|---|---|
| 5,835,566 A | * | 11/1998 | Cowgill | ............ H04M 3/2254 379/15.01 |
| 6,848,106 B1 | | 1/2005 | Hipp | |
| 7,542,467 B2 | * | 6/2009 | Rothman | ............... H04L 41/12 370/389 |

(Continued)

FOREIGN PATENT DOCUMENTS

| | | |
|---|---|---|
| WO | WO2010/144757 A1 | 12/2010 |
| WO | WO2011/051025 A1 | 5/2011 |

(Continued)

OTHER PUBLICATIONS

Mauelshagen, Heinz, "Logical Volume Manager (LVM2)", Red Hat Magazine, Sep. 23, 2004, 33 pages.

(Continued)

*Primary Examiner* — Glenford J Madamba
(74) *Attorney, Agent, or Firm* — Stephen R. Tkacs; Stephen J. Walder, Jr.; David Zwick (57) ABSTRACT

A mechanism is provided in a data processing system for monitoring a virtual machine in a distributed computing system. An out-of-virtual machine monitor receives, via an out-of-band path, disk and memory state data of the virtual machine exposed in a hypervisor hosting the virtual machine. The out-of-virtual machine monitor interprets logical information from the virtual machine disk and memory state data. The out-of-virtual machine monitor parses the logical information to extract related system or log information for a monitoring endpoint. The out-of-virtual machine monitor translates the system or log information to a standard format expected by the monitoring endpoint. The out-of-virtual machine monitor forwards a monitoring data stream to the monitoring endpoint.

24 Claims, 7 Drawing Sheets

(56) References Cited

U.S. PATENT DOCUMENTS

| | | | |
|---|---|---|---|
| 7,765,460 B2* | 7/2010 | DiFalco | G06F 8/60 714/41 |
| 7,853,958 B2* | 12/2010 | Mathew | G06F 11/0712 718/1 |
| 7,886,294 B2 | 2/2011 | Dostert et al. | |
| 8,533,715 B2* | 9/2013 | DeLuca | G06F 9/45558 718/1 |
| 8,539,570 B2 | 9/2013 | Sharma et al. | |
| 8,621,233 B1 | 12/2013 | Manadhata et al. | |
| 8,650,273 B2* | 2/2014 | Lambert | G06F 9/45533 709/223 |
| 8,806,625 B1 | 8/2014 | Berger | |
| 8,873,375 B2* | 10/2014 | Kim | G06F 11/203 370/218 |
| 8,875,124 B2* | 10/2014 | Kuzmack | G06F 9/45558 717/173 |
| 8,914,341 B2* | 12/2014 | DiFalco | G06F 17/30082 707/694 |
| 8,990,447 B1* | 3/2015 | Santhanam | H04L 12/40169 370/438 |
| 8,996,691 B1* | 3/2015 | Stickle | H04L 12/6418 709/224 |
| 9,009,521 B2* | 4/2015 | Jaisinghani | H04L 41/12 714/4.1 |
| 2003/0208463 A1 | 11/2003 | Vishlitzky et al. | |
| 2006/0225065 A1 | 10/2006 | Chandhok et al. | |
| 2007/0043860 A1 | 2/2007 | Pabari | |
| 2007/0043896 A1 | 2/2007 | Daruwala et al. | |
| 2007/0055710 A1 | 3/2007 | Malkin | |
| 2007/0089111 A1 | 4/2007 | Robinson et al. | |
| 2007/0150677 A1 | 6/2007 | Homma et al. | |
| 2008/0134177 A1 | 6/2008 | Fitzgerald et al. | |
| 2008/0163205 A1 | 7/2008 | Bennett et al. | |
| 2008/0263658 A1 | 10/2008 | Michael et al. | |
| 2009/0094428 A1 | 4/2009 | Nagata et al. | |
| 2009/0182928 A1 | 7/2009 | Becker et al. | |
| 2009/0254990 A1 | 10/2009 | McGee | |
| 2009/0319580 A1 | 12/2009 | Lorenz et al. | |
| 2010/0030983 A1 | 2/2010 | Gupta et al. | |
| 2010/0070725 A1 | 3/2010 | Prahlad et al. | |
| 2010/0107158 A1 | 4/2010 | Chen et al. | |
| 2010/0251363 A1* | 9/2010 | Todorovic | G06F 21/53 726/22 |
| 2010/0318993 A1* | 12/2010 | Goud | G06F 9/45537 718/1 |
| 2011/0131183 A1 | 6/2011 | Chandhok et al. | |
| 2011/0239268 A1* | 9/2011 | Sharp | G06F 9/45558 726/1 |
| 2014/0019661 A1* | 1/2014 | Hormuth | G06F 15/17331 710/306 |
| 2014/0115137 A1* | 4/2014 | Keisam | H04L 12/6418 709/223 |
| 2014/0165198 A1 | 6/2014 | Altman | |
| 2014/0280961 A1* | 9/2014 | Martinez | H04L 41/5054 709/226 |
| 2014/0337594 A1 | 11/2014 | Wade et al. | |
| 2014/0372596 A1 | 12/2014 | Bala et al. | |
| 2015/0032699 A1 | 1/2015 | Fujita et al. | |

FOREIGN PATENT DOCUMENTS

| | | |
|---|---|---|
| WO | WO2012132815 A1 | 10/2012 |
| WO | WO2012173831 A2 | 12/2012 |

OTHER PUBLICATIONS

Combined Search and Examination Report under Sections 17 and 18(3) dated Mar. 8, 2013, International Application No. GB1218642.5, 6 pages.

Examination Report under Section 18(3) dated Oct. 15, 2013, International Application No. GB1218642.5, 3 pages.

"Libguestfs, tools for accessing and modifying virtual machine disk images", http://libguestfs.org, released May 15, 2013, 2 pages.

"Server Consolidation using IBM BladeCenter and VMware Infrastructure", VMWARE, Inc., https://www.vmware.com/pdf/bladecenter_wp_q206.pdf, 2005, 12 pages.

Bala, Vasanth et al., "Passive Monitoring of Virtual Systems Using Agent-Less, Near-Real-Time Indexing", USPTO U.S. Appl. No. 13/920,288 filed Jun. 18, 2013, 50 pages.

Fu, Yangchun et al., "Space Traveling across VM: Automatically Bridging the Semantic Gap in Virtual Machine Introspection via Online Kernel Data Redirection", 2012 IEEE Symposium on Security and Privacy, San Francisco, California, May 20-23, 2012, pp. 586-600.

Garfinkel, Tal et al., "A Virtual Machine Introspection Based Architecture for Intrusion Detection", The 10th Annual Network and Distributed System Security Symposium (NDSS'03), San Diego, California, Feb. 6-7, 2003, 16 pages.

Gilly, Richard P. et al., "Recent Developments in Patent Enforcement in the Cloud", BNA's Patent, Trademark & Copyright Journal, Nov. 4, 2011, 6 pages.

Jiang, Xuxian et al., "Stealthy Malware Detection and Monitoring through VMM-Based "Out-of-the-Box" Semantic View Reconstruction", ACM Transactions on Information and System Security, vol. 13, No. 2, Article 12, Feb. 2010, 28 pages.

Kotsovinos, Evangelos et al., "Virtualization: Blessing or Curse?", ACM Queue, https://queue.acm.org/detail.cfm?id=1889916, vol. 8, No. 11, Nov. 22, 2010, 3 pages.

Mauelshagen, Heinz et al., "The Linux Logical Volume Manager", Red Hat Magazine, Issue #9, Jul. 2005, 13 pages.

Nance, Kara et al., "Investigating the Implications of Virtual Machine Introspection for Digital Forensics", 2009 International Conference on Availability, Reliability and Security, IEEE, Mar. 16-19, 2009, pp. 1024-1029.

Paranjape, Kapil H., "Right to Your Own Devices", Linux Gazette, http://linuxgazette.net/114/kapil.html, May 2005, 9 pages.

Parush, Naama et al., "Out-of-Band Detection of Boot-Sequence Termination Events", ICAC '09, Jun. 15-19, 2009, Barcelona, Spain, 2 pages.

Pelleg, Dan et al., "Vigilant: Out-of-Band Detection of Failures in Virtual Machines", ACM SIGOPS Operating Systems Review 42, No. 1, 2008, 6 pages.

Pomeranz, H., "Mounting Images Using Alternate Superblocks", http://computer-forensics.sans.org/, Dec. 2008, 4 pages.

Reimer, Darrell et al., "Opening Black Boxes: Using Semantic Information to Combat Virtual Machine Image Sprawl", The 2008 ACM SIGPLAN/SIGOPS International Conference on Virtual Execution Environments (VEE'08), Seattle, Washington, Mar. 5-7, 2008, pp. 111-120.

Smith, Duncan et al., "Approaches to Multisensor Data Fusion in Target Tracking: A Survey", IEEE Transactions on Knowledge and Data Engineering, vol. 18, No. 12, Dec. 2006, 15 pages.

Srinivasan, Deepa et al., "Process Out-Grafting: An Efficient "Out-of-VM" Approach for Fine-Grained Process Execution Monitoring", IBM Corporation, Workshop for Frontiers of Cloud Computing, IBM T.J. Watson Research Center, New York, Dec. 1, 2011, 41 pages.

Srinivasan, Deepa et al., "Process Out-Grafting: An Efficient "Out-of-VM" Approach for Fine-Grained Process Execution Monitoring", Proceedings of the 18th ACM conference on Computer and Communications Security, CCS'11, Oct. 17-21, 2011, Chicago, Illinois, 12 pages.

Wang, Yao et al., "An In-Out-VM Measurement Architecture Against Dynamic Attacks in Clouds", 2012 IEEE 14th International Conference on Communication Technology (ICCT), Nov. 2012, pp. 761-767.

\* cited by examiner

FIG. 6 ously common problem with these existing techniques is that they fail to provide the required information at exactly the most crucial moments they are needed, e.g., when there is a configuration problem, when a system becomes unresponsive, or when there is malicious activity in
ALWAYS-ON MONITORING IN THE CLOUD

BACKGROUND

The present application relates generally to an improved data processing apparatus and method and more specifically to mechanisms for an out-of-band virtual machine monitoring framework and a hybrid monitoring model that combines an in-band virtual machine agent and an out-of-band virtual machine introspection-based monitoring technique.

Cloud computing is a phrase used to describe a variety of computing concepts that involve a large number of computers connected through a real-time communication network such as the Internet. In science, cloud computing is a synonym for distributed computing over a network, and means the ability to run a program or application on many connected computers at the same time. The phrase also more commonly refers to network-based services, which appear to be provided by real server hardware, and are in fact served up by virtual hardware, simulated by software running on one or more real machines. Such virtual servers do not physically exist and can therefore be moved around and scaled up or down on the fly without affecting the end user.

A virtual machine (VM) is a software implementation of a machine (i.e., a computer or server) that executes programs like a physical machine. A virtual machine provides a complete system platform which supports the execution of a complete operating system (OS). A VM may emulate an existing architecture. A VM may be built with the purpose of providing a platform to run programs where the real hardware is not available for use (e.g., executing software on otherwise obsolete platforms) or the purpose of having multiple instances of virtual machines leading to more efficient use of computing resources, both in terms of energy consumption and cost effectiveness.

SUMMARY

In one illustrative embodiment, a method, in a data processing system, is provided for monitoring a virtual machine in a distributed computing system. The method comprises receiving, via an out-of-band path, disk and memory state data of the virtual machine exposed in a hypervisor hosting the virtual machine. The method further comprises interpreting logical information from the virtual machine disk and memory state data. The method further comprises parsing the logical information to extract related system or log information for a monitoring endpoint. The method further comprises translating the system or log information to a standard format expected by the monitoring endpoint. The method further comprises forwarding a monitoring data stream to the monitoring endpoint.

In another illustrative embodiment, a method, in a data processing system, is provided for monitoring a virtual machine in a distributed computing system. The method comprises receiving, via an out-of-band path, disk and memory state data of the virtual machine exposed in a hypervisor hosting the virtual machine as an out-of-band data stream. The method further comprises receiving, via an in-band path, an in-band data stream from the virtual machine. The method further comprises normalizing the in-band data stream and the out-of-band data stream to a common format. The method further comprises determining the monitoring data stream, selected between the in-band data stream and the out-of-band data stream, to forward to the monitoring endpoint.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiments.

In yet another illustrative embodiment, a system or apparatus is provided. The system or apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiments.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Monitoring configuration, health, resource usage, and other features of computer systems is critical for the efficient and reliable operation of the computer systems. There is a vast ecosystem of well-established monitoring, configuration, log, and audit tracking solutions in data centers, which almost exclusively rely on either periodically accessing the running system to pull data of interest from the system or incorporating small software components inside the system to push the data of interest to an analytics or data warehousing backend. The "pull" solution may log in, take over a network socket, etc. The "push" solution may use an agent, daemon, cron job, etc.

One universally common problem with these existing techniques is that they fail to provide the required information at exactly the most crucial moments they are needed, e.g., when there is a configuration problem, when a system becomes unresponsive, or when there is malicious activity in the system. This is because the techniques that rely on the cooperation of the targeted system break when the targeted system stops functioning or responding to queries or when the methods of pushing data out of the system are subverted by malicious processes.

The same problem remains and may be exacerbated in cloud environments where dynamism and scale are much higher. In a cloud running virtualized system instances, an alternative way to get to the data is via introspection by leveraging virtualization abstractions. Introspection-based techniques do not necessitate guest cooperation, and more importantly can still function, by interpreting guest system disk and memory data structures from outside the guest, even when the guest system is nonresponsive or hung. One potential caveat with this out-of-band approach is the techniques built over introspection may not be as feature-rich and may be less real-time than their in-band counterparts. On the flip side, as mentioned above, the out-of-band approaches can remain "always-on." even when the guest systems are nonresponsive or compromised.

As generally used, the term "out-of-band" refers to a communication channel or path that is not the main path. In the embodiments described herein, an in-band approach involves receiving information directly from the virtual machine, e.g., via an in-VM agent, while an out-of-band approach involves receiving information using another path. In accordance with the illustrative embodiments described below, the in-band approach involves receiving information via an in-VM agent or via remote access into the virtual machine; the out-of-band approach involves receiving information via a monitor that is outside the virtual machine, i.e., an out-of-VM monitor. The in-band path is also referred to herein as the in-VM path, and the out-of-band path is also referred to as the out-of-VM path.

Thus, the illustrative embodiments provide a mechanism for an out-of-band virtual machine monitoring framework that uses introspection. Attach logic exposes the states of virtual machine disk and memory to an out-of-VM monitor. The out-of-VM monitor comprises connection logic to connect to the exposed VM disk and memory states, a filesystem or memory interpreter that interprets the logical information from the raw disk and memory states, and parsing and translation logic that extracts related system log information for the desired monitoring task and translates the information to a standardized format that is expected by the monitoring endpoint. In the illustrative embodiments, the monitoring endpoint may provide other functions in addition to monitoring, such as analytics, for example.

The illustrative embodiments also provide a hybrid monitoring model that combines the strengths of an in-VM agent with remote access monitoring and out-of-VM introspection-based monitoring to provide agile, always-on monitoring in the cloud. A monitoring broker receives data through both an in-VM agent and an out-of-VM attach logic that exposes VM disk and memory states. For the in-VM path, the data are processed on the VM side via an agent or by a monitoring broker after getting the raw critical information via remote access into the virtual machine. For the out-of-VM path, the virtual machine's raw disk and memory state information is exposed in various forms, such as network-mapped file or device, via network communication with the hypervisor, via remote memory access, or the like. After processing both sources of information, the monitoring broker normalizes each stream of information to a common format.

The monitoring broker decides which of the two streams of information to propagate to the endpoint. If the monitored data are equivalent through both paths, the broker forwards the first copy of the data received through either path. If one source of the data has richer features than the other source, then the monitoring broker selects the more feature-rich data stream. If either stream becomes unavailable, the monitoring broker propagates the other data stream. The monitoring broker may also track the health of the in-VM solution via the out-of-VM path. If data from the in-VM path and the out-of-VM path begin to deviate substantially, the monitoring broker may alert a security solution of a potential compromise.

A "mechanism." as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
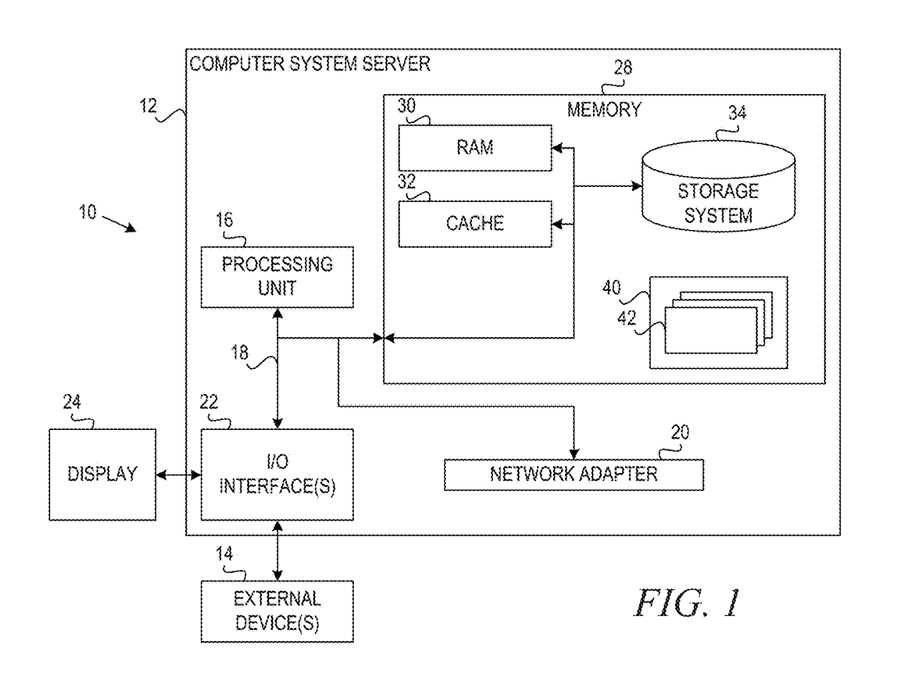
FIG. 1 depicts a cloud computing node according to an illustrative embodiment.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system or server 12, which is operational with numerous other general purpose or special purpose computing system environments or configurations. Examples of well-known computing systems, environments, and/or configurations that may be suitable for use with computer system or server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system or server 12 may be described in the general context of computer system executable instructions, such as program modules, being executed by a computer system. Generally, program modules may include routines, programs, objects, components, logic, data structures, and so on that perform particular tasks or implement particular abstract data types. Computer system or server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system or server 12 in cloud computing node 10 is shown in the form of a general-purpose computing device. The components of computer system or server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system or server 12 typically includes a variety of computer system readable media. Such media may be any available media that is accessible by computer system or server 12, and it includes both volatile and non-volatile media, removable and non-removable media.

System memory 28 can include computer system readable media in the form of volatile memory, such as random access memory (RAM) 30 and/or cache memory 32. Computer system or server 12 may further include other removable or non-removable, volatile or non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program or utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system or server 12 may also communicate with one or more external devices 14 such as a keyboard, a pointing device, a display 24, etc.; one or more devices that enable a user to interact with computer system or server 12; and/or any devices (e.g., network card, modem, etc.) that enable computer system or server 12 to communicate with one or more other computing devices. Such communication can occur via Input/Output (I/O) interfaces 22. Still yet, computer system or server 12 can communicate with one or more networks such as a local area network (LAN), a general wide area network (WAN), and/or a public network (e.g., the Internet) via network adapter 20. As depicted, network adapter 20 communicates with the other components of computer system or server 12 via bus 18. It should be understood that although not shown, other hardware and/or software components could be used in conjunction with computer system or server 12. Examples, include, but are not limited to: microcode, device drivers, redundant processing units, external disk drive arrays, RAID systems, tape drives, and data archival storage systems, etc.

Figure 2:
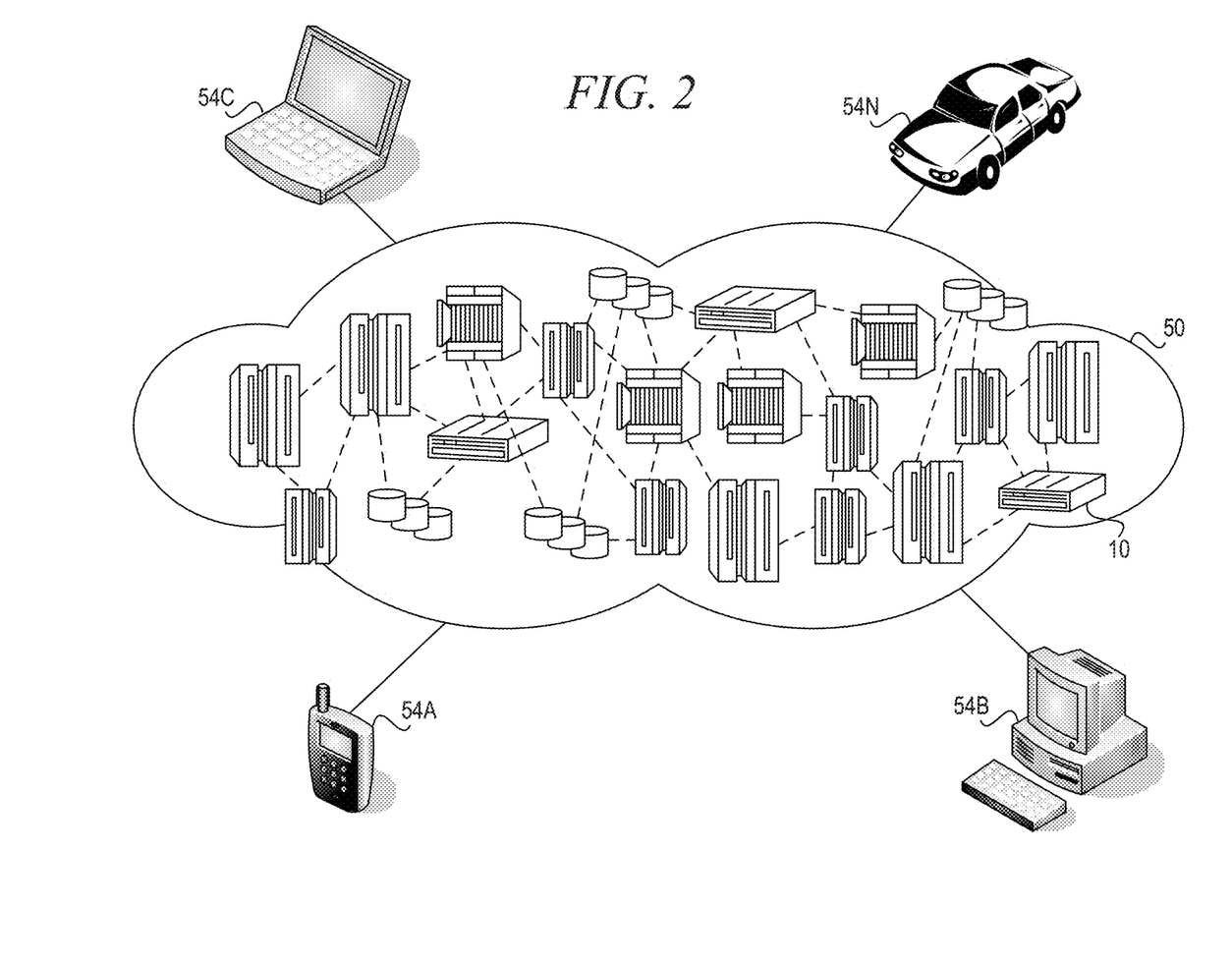
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
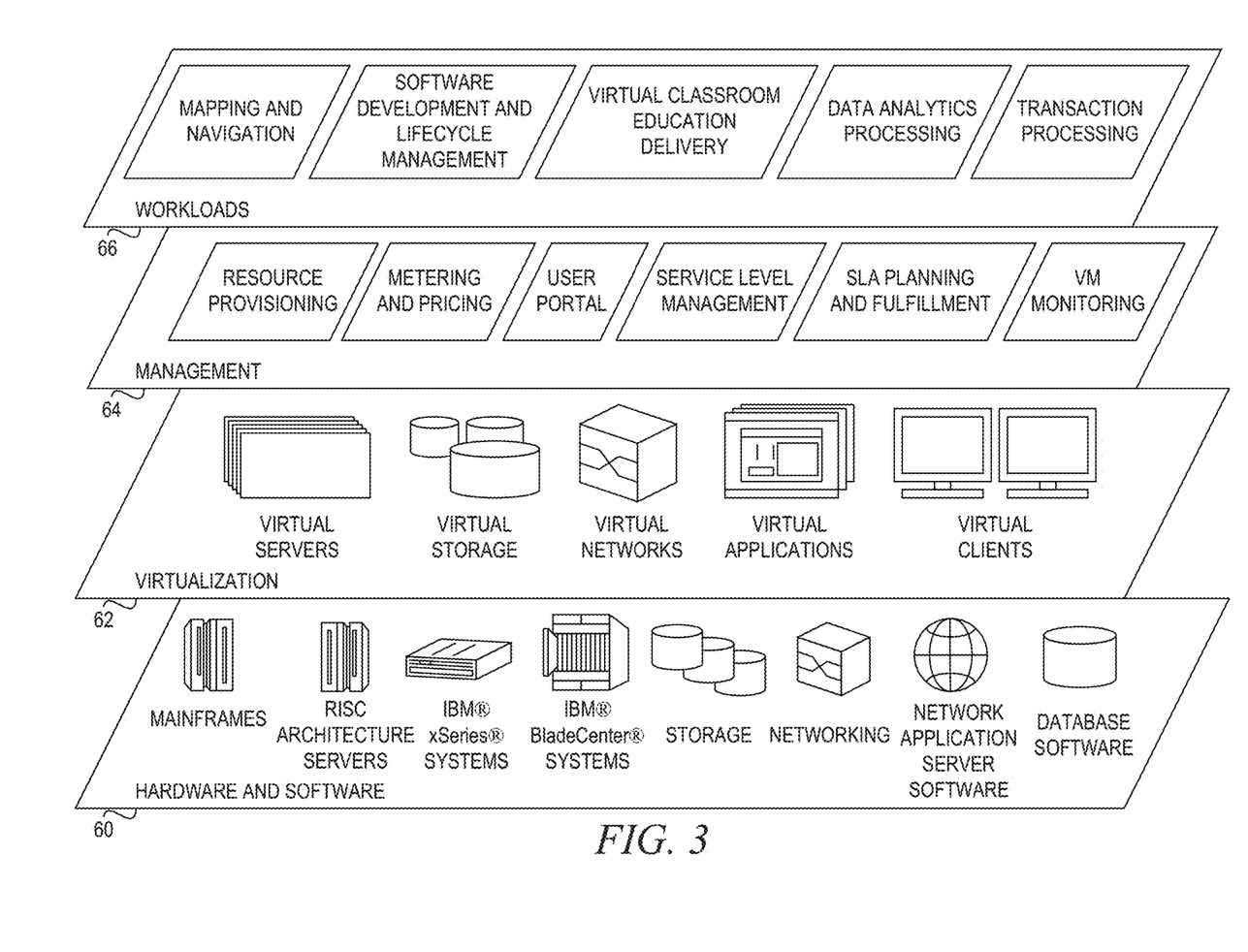
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Figure 4:
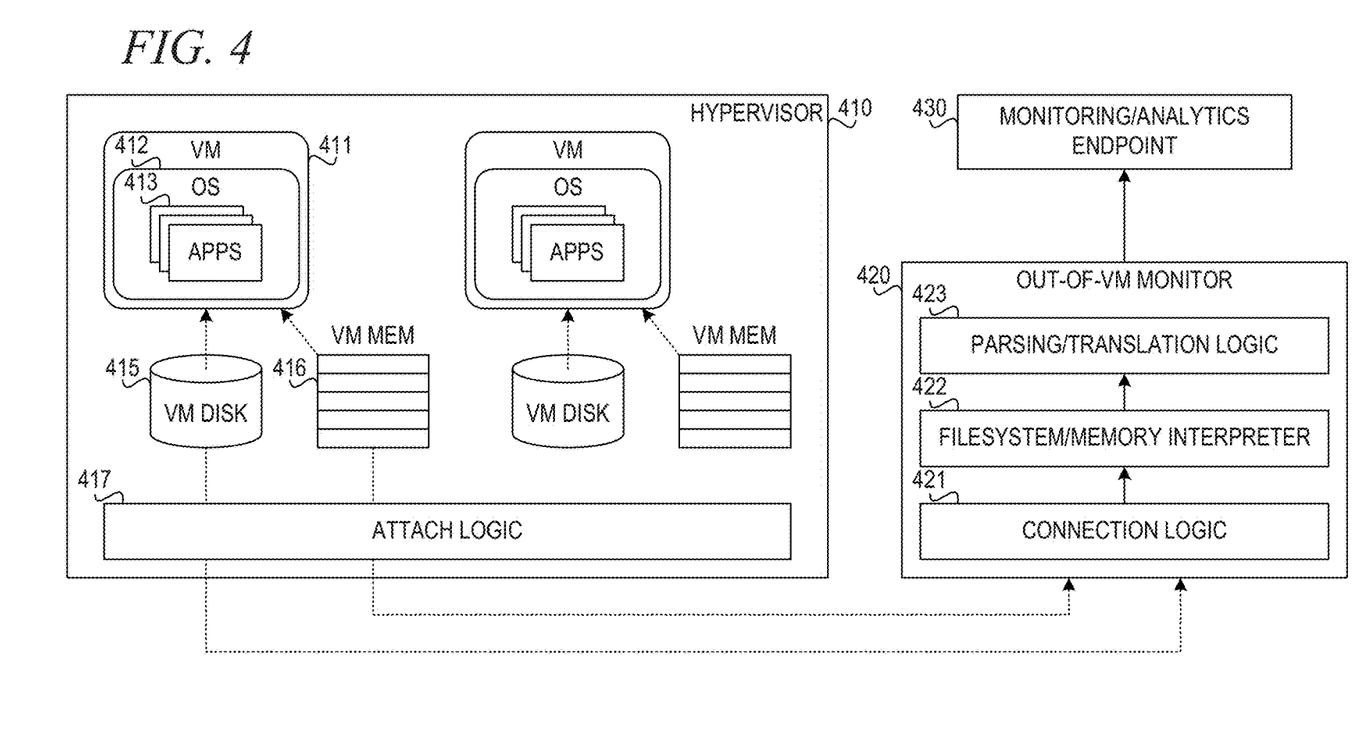
FIG. 4 is a block diagram of a mechanism for out-of-band virtual machine monitoring in accordance with an illustrative embodiment.

Virtual machine (VM) monitoring tracks the configuration, health, resource usage, and other features of a virtual machine within a cloud computing environment. In accordance with the illustrative embodiments, VM monitoring provides mechanisms for an out-of-band VM monitoring framework and a hybrid monitoring model that combines the strengths of an in-VM agent with remote access monitoring and out-of-VM introspection-based monitoring to provide agile, always-on monitoring in the cloud. A monitoring broker receives data through both an in-VM agent and attach logic that exposes VM disk and memory states FIG. 4 is a block diagram of a mechanism for out-of-band virtual machine monitoring in accordance with an illustrative embodiment. Hypervisor 410, also referred to as a virtual machine manager (VMM), is a piece of computer software, firmware, or hardware that creates and runs virtual machines 411. The computer on which hypervisor 410 is running one or more virtual machines 411 is referred to as a host machine. Each virtual machine 411 is called a guest machine. Hypervisor 410 presents guest operating systems 413 with a virtual operating platform and manages the execution of guest operating systems 413. Multiple instances of a variety of operating systems may share the virtualized hardware resources. Hypervisor 410 establishes a plurality of virtual machines 411: each virtual machine (VM) 411 hosts an operating system 412 and runs one or more applications 413. Each VM 411 has at least one disk component 415 and part of physical memory of hypervisor 410 mapped as VM memory 416.

Attach logic 417, shown in hypervisor 410, exposes the states of VM disk 415 and VM memory 416 in their raw format. The disk state of the VM may be represented as a file on the hypervisor filesystem, a direct-mapped local or remote block device, or other virtual disk formats, such as QCOW and VMDK. QCOW is a file format for disk image files used by QEMU, a hosted virtual machine monitor.

QCOW stands for "QEMU Copy On Write" and uses a disk storage optimization strategy that delays allocation of storage until it is actually needed. QEMU, short for "Quick EMUlator," is a free and open-source hosted hypervisor that performs hardware virtualization. VMDK (Virtual Machine Disk) is a container for virtual hard disk drives to be used in virtual machines. In either case, the attach logic 417 creates a local block device wrapper (such as a loop device, device mapper) or a network attached device wrapper (such as Internet Small Computer Systems Interface (iSCSI), Network Block Device (NBD)) around the actual device. By simple virtualization and filesystem utilities (such as QEMU image analysis tools), it can discover any additional backing devices that also must be exposed (such as in QCOW disks).

The memory state of VM 411 may be exposed by various methods, such as dumping, migrating to file, snapshotting guest memory, or other techniques, such as remote direct memory access (RDMA) or via hypervisor-level application programming interfaces (APIs). Attach logic 417 exposes the memory state using similar techniques as used for the disk state.

Out-of-VM monitor 420 performs monitoring operations by discovering the monitoring related information from the exposed states of VM disk 415 and VM memory 416. Out-of-VM monitor 420 includes connection logic 421, which connects to the exposed VM disk and memory states via various methods. If the exposed state is locally accessible, the connection logic 421 connects to the exposed states by read-only, protected access. For remote access, connection logic 421 uses access protocols such as iSCSI or uses network block devices.

Filesystem or memory interpreter 422 interprets the logical information from the raw disk and memory state by bridging the semantic gap between the physical blocks (disk) and bytes (memory) and the logical filesystem entries (disk) and in-memory data structures (memory). This interpretation can be as simple as mounting the filesystem of a disk. Alternatively, filesystem or memory interpreter 422 may map well-known operating data structures on the address space of the exposed linear memory based on the inspection of blocks and discovery of file-level information. In an alternative embodiment, filesystem or memory interpreter 422 may use heuristics to discover data structures, based on their known sizes, contents, etc., in the overall memory space. These methods enable the out-of-VM monitor to extract the logical contents of the virtual machine's disk and memory state.

Parsing and translation logic 423 sits atop the logical view of the VM disk and memory and extracts the required information for the desired monitoring endpoint application 430, similar to the way an in-VM monitoring agent would operate. This process potentially involves parsing log file, such as system and application logs, etc., reading the values from various in-memory data structures to gather system information, such as resource use accounting, network device configurations, etc. Once the required data are gathered, the data are translated to a format that is expected by the monitoring analytics endpoint 430.

While the above described out-of-band approach works even when a virtual system is unresponsive or compromised, the approach may be not as feature rich and may be less real-time than an in-VM counterpart. Due to this tradeoff, the illustrative embodiments also provide a mechanism for an always-on monitoring solution based on a hybrid monitoring approach that captures the best of both in-band and out-of-band approaches to provide always-on monitoring in the cloud.

Figure 5:
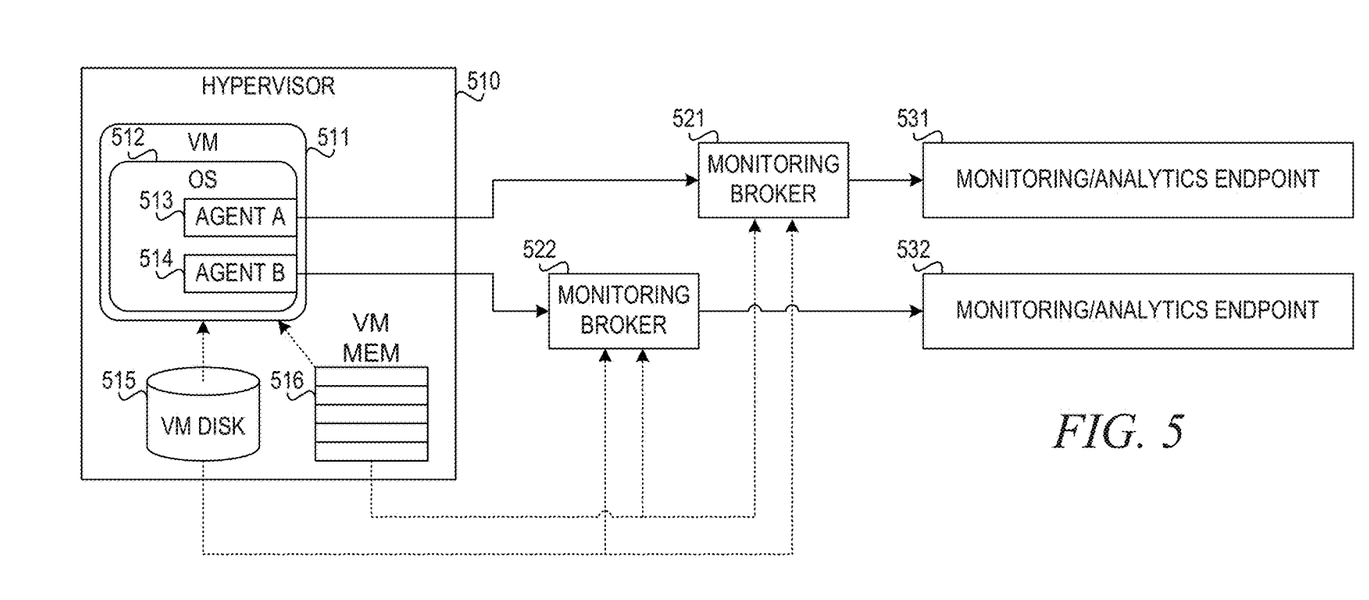
FIG. 5 is a block diagram of a mechanism for a hybrid virtual machine monitoring model in accordance with an illustrative embodiment.

FIG. 5 is a block diagram of a mechanism for a hybrid virtual machine monitoring model in accordance with an illustrative embodiment. Hypervisor 510 creates and runs virtual machine 511 with operating system 512. Each VM 511 has at least one disk component 515 and part of physical memory of hypervisor 510 mapped as VM memory 516.

In the example shown in FIG. 5, the hybrid monitoring system has two example monitoring backends: monitoring endpoint 531 provides performance or resource usage monitoring, and monitoring endpoint 532 provides log analytics and audit tracking. The path through the solid lines depicts in-band monitoring. In the depicted example, in-band monitoring is shown as an agent based approach; however, in an alternative embodiment, the in-band monitoring may be shown as a remote-access based approach. The dashed lines show the out-of-band monitoring path, using disk and memory introspection in the depicted example.

Monitoring brokers 521, 522 receive data of interest through both the in-band monitoring path and the out-of-band monitoring path. For example, in FIG. 5, monitoring broker 521 receives data from an in-band path, also referred to herein as the in-VM path, via agent A 513 and receives data from an out-of-band path, also referred to herein as the out-of-VM path, via exposure to VM disk 515 and VM memory 516. Similarly, monitoring broker 522 receives data from an in-VM path via agent B 514 and receives data from an out-of-VM path via exposure to VM disk 515 and VM memory 516. For the in-VM path, the data are processed on the virtual machine side via an agent 513, 514 or by the monitoring brokers 521, 522 after getting the raw critical information via remote access into the VM 511.

For the out-of-VM path, the raw state data for VM disk 515 and VM memory 516 are exposed to monitoring brokers 521, 522 through hypervisor 510 without accessing VM 511. The state data can be exposed in various forms, such as a network-mapped file or device, via network communication with the hypervisor 510, via remote memory access, or the like. Monitoring brokers 521, 522 parse the critical data from exposed VM states by walking through the relevant data structures exposed from the VM disk 515 and memory 516 states.

After processing both sources of information, monitoring brokers 521, 522 normalize each stream of information to a common format that is particular to the monitoring solutions and understood by monitoring endpoints 531, 532. Monitoring brokers 521, 522 decide which of the two streams is propagated to its endpoint 531, 532. If the monitored data are equivalent through both paths, monitoring broker 521, 522 forwards the first copy of the data received through either path to improve the real-time response of the overall solution. Monitoring broker 521, 522 performs a data equivalency test by matching event identifiers (e.g., system, event, and audit logs), timestamps (e.g., periodic monitoring), or pure textual comparison.

If one source of the data has richer features than the other source, then monitoring broker 521, 522 selects the feature-rich data to be forwarded. However, in the case the feature-rich data are unavailable, the broker falls back to the less rich but available data once a trigger condition for switching sources is met. The trigger condition can be implemented as a specified break-even period. If no data flows from one source during this period, the monitoring broker switches to the alternative source. Alternatively, the trigger condition can be based on a specified number of missing samples from one source, which can trigger switching to the other data source. The trigger condition can further be implemented by other methods such as application heartbeats, system-level signaling techniques and others. For example, for system health monitoring by endpoint 531, the in-VM agent 513 may provide a richer set of composite information, which might not be readily available from out-of-VM monitoring. In this case, as long as the in-VM data are received, monitoring broker 521 propagates the in-VM data to endpoint 531. When these data stop trickling to monitoring broker 521 from the in-VM path—probably due to a system problem—monitoring broker 521 switches to the out-of-VM path for providing endpoint 531 with continuous information.

In one embodiment, monitoring agents 521, 522 infer the availability of the information through either path. Monitoring agents 521, 522 may infer availability of information via a simple timeout mechanism. If one source fails to provide any information for a predetermined time duration, monitoring agent 521, 522 may assume the information is unavailable. This approach is most feasible for periodic monitoring events where data are expected at regular time intervals. Alternatively, monitoring agents 521, 522 may infer availability of information by matching event identifiers or timestamps of the two sources. This approach may be preferable for many event-driven log or audit tracking solutions where events are prepended with unique, ordered identifiers. In another embodiment, monitoring agents 521, 522 actively track data availability via "heartbeats" as many existing management solutions incorporate some form of health status checking among their distributed components to verify their availability and accessibility.

In another example embodiment, monitoring brokers 521, 522 explicitly track the health of the in-VM solution using the out-of-VM paths. An existing in-VM solution exhibits a certain "footprint" on the running system, such as certain running processes, existence of certain files or packages, certain opened ports for communication, and the like. Furthermore, in many cases, these techniques also update in-VM logs, which reflect their operational status. By monitoring the footprint of an in-VM solution, through the out-of-VM paths, the monitoring broker 521, 522 can identify whether the in-VM solution is operating properly. In the case of an identified failure, monitoring broker 521, 522 can switch to the out-of-VM monitoring path and alert the monitoring endpoint 531, 532 for potential remedial actions to revive the in-VM path.

An additional application of the hybrid monitoring approach is "sandboxing" the in-VM monitoring logic inside the monitoring broker. For example, when a new agent is to be deployed or an update to in-VM monitoring is designed, the new logic can be exercised in the monitoring broker before deploying on the actual system.

Another application of the hybrid approach is for determining potential compromise in a monitored system. If the in-VM data and the out-of-VM data begin to substantially deviate (e.g., due to a rootkit attack that misrepresents system information, such as open ports, running processes to the in-VM monitor), then the monitoring broker can use this discrepancy to inform a security solution of a potential compromise. The monitoring broker can further quarantine the system by snapshotting its current disk and memory state or by suspending the system execution.

Similarly, an application of the hybrid monitoring approach can be to detect and alert for an anomaly when an in-VM path becomes unavailable, indicating a potential anomaly or outage in a system.

In one example embodiment, the out-of-VM monitoring path is "always attached" for each virtual machine, providing continuous out-of-band monitoring capability. In an alternative embodiment, the out-of-band path can be "attached on demand," where the monitoring broker attaches to an out-of-VM path in response to a user-driven or automated attach request. For example, such a request can be automatically initiated when the data from the in-VM path become unavailable.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
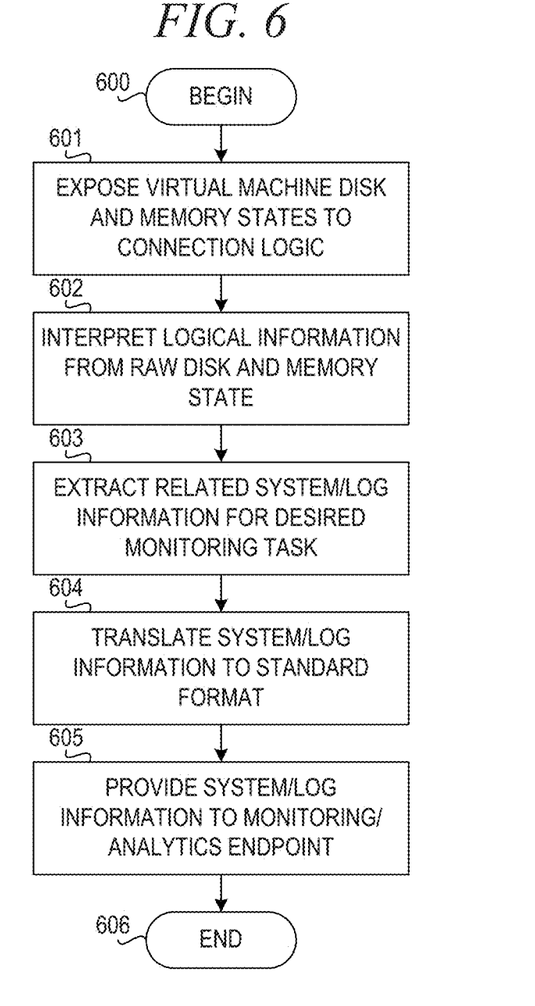
FIG. 6 is a flowchart illustrating operation of a mechanism for out-of-band virtual machine monitoring in accordance with an illustrative embodiment.

FIG. 6 is a flowchart illustrating operation of a mechanism for out-of-band virtual machine monitoring in accordance with an illustrative embodiment. Operation begins (block 600), and the mechanism exposes virtual machine disk and memory states to connection logic in an out-of-VM monitor (block 601). The out-of-VM monitor performs monitoring operations by discovering monitoring-related information from these exposed states. The connection logic connects to the exposed VM disk and memory states.

The out-of-VM monitor interprets logical information from the raw disk and memory state (block 602). This enables the out-of-VM monitor to extract the logical contents of the virtual machine's disk and memory state. The out-of-VM monitor extracts related system or log information for the desired monitoring task (block 603). The out-of-VM monitor then translates the system or log information to a standard format that is expected by the monitoring endpoint (block 604). The out-of-VM monitor then provides the system or log information to the monitoring endpoint (block 605), and operation ends (block 606). The operations shown in FIG. 6 may be performed periodically, continuously, or on demand.

Figure 7:
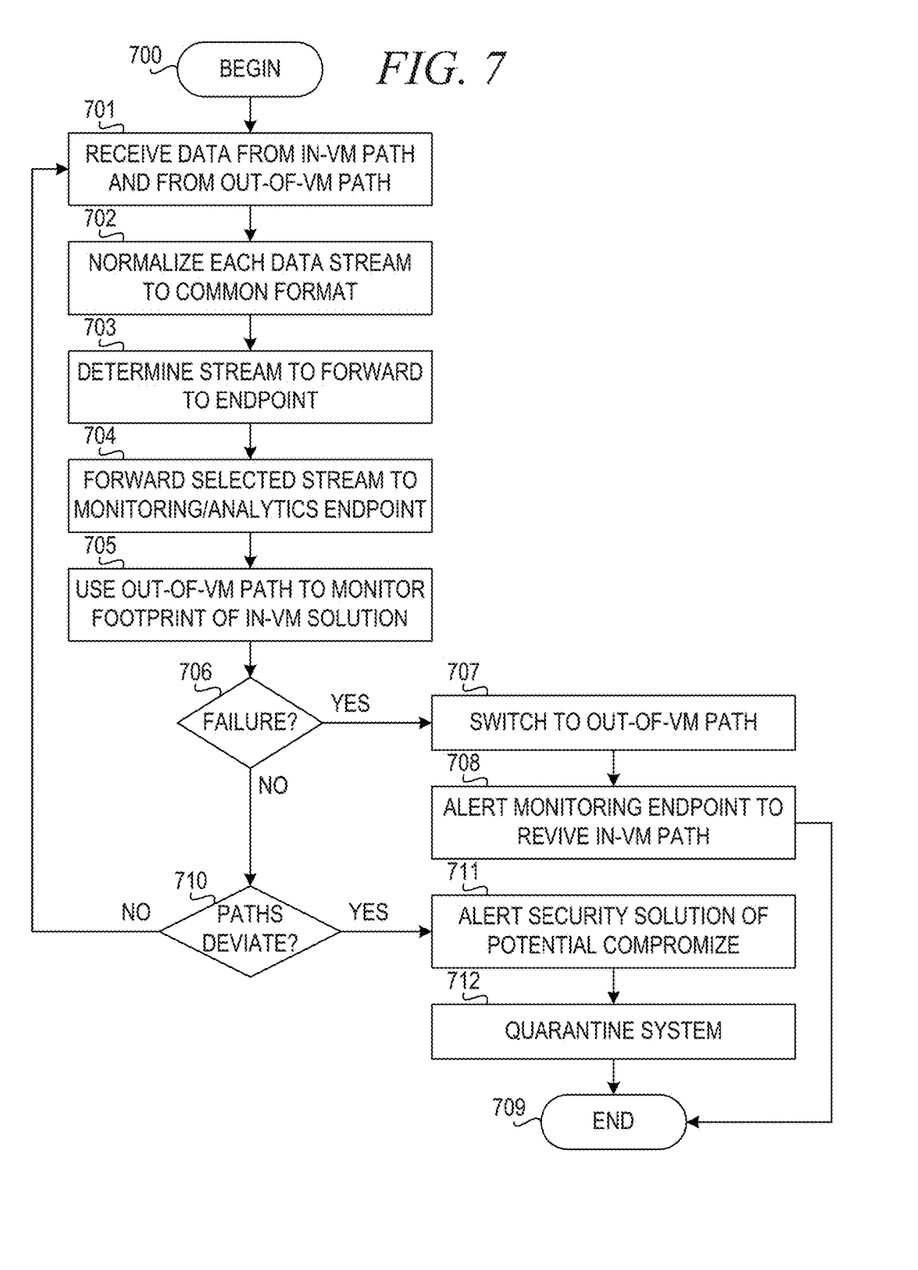
FIG. 7 is a flowchart illustrating operation of a monitoring broker for a hybrid virtual machine monitoring model in accordance with an illustrative embodiment.

FIG. 7 is a flowchart illustrating operation of a monitoring broker for a hybrid virtual machine monitoring model in accordance with an illustrative embodiment. Operation begins (block 700), and the monitoring broker receives data from an in-VM path and an out-of-VM path (bock 701). The monitoring broker normalizes each data stream to a common format (block 702). The monitoring broker then determines a stream to forward to the endpoint (block 703) and forwards the selected stream to the monitoring endpoint (block 704). If the monitored data is equivalent through both paths, the broker forwards the first copy of data received through either path. If one source of data has richer features, then the monitoring broker selects the more feature rich data. If one data source becomes unavailable, the monitoring broker selects the remaining data source.

The monitoring broker then uses the out-of-VM path to monitor the footprint of the in-VM solution (block 705). The monitoring broker determines whether the footprint of the in-VM solution exposed through the out-of-VM path indicates a failure of the in-VM solution (block 706). An existing in-VM solution exhibits a certain "footprint" on the running system, such as certain running processes, existence of certain files or packages, certain opened ports for communication, and the like. Furthermore, in many cases, these techniques also update in-VM logs, which reflect their operational status. By monitoring the footprint of an in-VM solution, through the out-of-VM paths, the monitoring broker can identify whether the in-VM solution is operating properly. If the monitoring broker detects a failure, the monitoring broker switches to the out-of-VM path (bock 707) and alerts the monitoring endpoint to revive the in-VM path (block 708). Thereafter, operation ends (block 709).

If the monitoring broker does not detect a failure in block 706, the monitoring broker determines whether the data received from the in-VM path and the out-of-VM path substantially deviate (block 710). If the paths do not deviate, then operation returns to block 701 to receive data from the in-VM path and from the out-of-VM path and operation repeats. If the paths deviate in block 710, the monitoring broker alerts a security solution of a potential compromise (block 711). The monitoring then quarantines the system (block 712). Thereafter, operation ends (block 709).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a data processing system, causes the data processing system to:
    receive, by a monitoring broker executing on at least one processor of the data processing system, exposed disk and memory state data of the virtual machine as an out-of-band data stream via an out-of-band path comprising attach logic within a hypervisor executing on the at least one processor within the distributed computing system and hosting the virtual machine;
    receive, by the monitoring broker, an in-band data stream from the virtual machine via an in-band path comprising a software agent executing within the virtual machine on the at least one processor within the distributed computing system;
    normalize, by the monitoring broker, the in-band data stream and the out-of-band data stream to a common format;
    determine, by the monitoring broker, the monitoring data stream, selected between the in-band data stream and the out-of-band data stream, to forward to a monitoring endpoint within the distributed computing system;
    forward the monitoring data stream from the monitoring broker to the monitoring endpoint;
    use the out-of-band data stream to monitor a footprint of the in-band path; and
    responsive to determining a failure of the in-band path based on the footprint of the in-band path, select the out-of-band data stream to forward to the monitoring endpoint and alert the monitoring endpoint to revive the in-band path.

2. The computer program product of claim 1, wherein the computer readable program further causes the data processing system to:
    responsive to determining the in-band data stream and the out-of-band data stream substantially deviate, alert a security solution of a potential compromise of the in-band path and quarantine the virtual machine.

3. The computer program product of claim 1, wherein determining the monitoring data stream comprises:
    responsive to the in-band-data stream and the out-of-band data stream being substantially equivalent, selecting an earliest received data stream between the in-band data stream and the out-of-band data stream.

4. The computer program product of claim 1, wherein determining the monitoring data stream comprises:
    responsive to a given data stream between the in-band data stream and the out-of-band data stream being more feature rich than the other, selecting the given data stream.

5. The computer program product of claim 1, wherein the computer readable program further causes the data processing system to interpret logical information from the exposed disk and memory state data, parse the logical information to extract related system or log information, and translate the system or log information to a standard format expected by the monitoring endpoint.

6. The computer program product of claim 5, wherein interpreting logical information from the exposed disk and memory state data comprises mounting a filesystem of the disk, inspecting blocks of the disk to discover file-level information, mapping well-known operating data structures on an address space of the memory, or using heuristics to discover data structures in the memory.

7. An apparatus, comprising:
    a processor; and
    a memory coupled to the processor, wherein the memory comprises instructions which, when executed by the processor, cause the processor to:
    receive, by a monitoring broker executing on at least one processor of a data processing system, exposed disk and memory state data of the virtual machine as an out-of-band data stream via an out-of-band path comprising attach logic within a hypervisor executing on the at least one processor within the distributed computing system and hosting the virtual machine;
    receive, by the monitoring broker, an in-band data stream from the virtual machine via an in-band path comprising a software agent executing within the virtual machine on the at least one processor within the distributed computing system;
    normalize, by the monitoring broker, the in-band data stream and the out-of-band data stream to a common format;
    determine, by the monitoring broker, the monitoring data stream, selected between the in-band data stream and the out-of-band data stream, to forward to a monitoring endpoint within the distributed computing system a monitoring endpoint within the distributed computing system;

forward the monitoring data stream from the monitoring broker to the monitoring endpoint;

use the out-of-band data stream to monitor a footprint of the in-band path; and responsive to determining a failure of the in-band path based on the footprint of the in-band path, select the out-of-band data stream to forward to the monitoring endpoint and alert the monitoring endpoint to revive the in-band path.

8. The apparatus of claim 7, wherein the instructions further cause the processor to:

responsive to determining the in-band data stream and the out-of-band data stream substantially deviate, alert a security solution of a potential compromise of the in-band path and quarantine the virtual machine.

9. The apparatus of claim 7, wherein determining the monitoring data stream comprises:

responsive to the in-band-data stream and the out-of-band data stream being substantially equivalent, selecting an earliest received data stream between the in-band data stream and the out-of-band data stream.

10. The apparatus of claim 7, wherein determining the monitoring data stream comprises:

responsive to a given data stream between the in-band data stream and the out-of-band data stream being more feature rich than the other, selecting the given data stream.

11. The apparatus of claim 7, wherein the instructions further cause the processor to interpret logical information from the exposed disk and memory state data, parse the logical information to extract related system or log information, and translate the system or log information to a standard format expected by the monitoring endpoint.

12. The apparatus of claim 11, wherein interpreting logical information from the exposed disk and memory state data comprises mounting a filesystem of the disk, inspecting blocks of the disk to discover file-level information, mapping well-known operating data structures on an address space of the memory, or using heuristics to discover data structures in the memory.

13. The apparatus of claim 7, wherein the disk state data are represented as a file on the hypervisor filesystem, a direct-mapped local or remote block device, or a virtual disk format.

14. The apparatus of claim 7, wherein the attach logic creates a local block device wrapper or network attached device wrapper around the disk.

15. The apparatus of claim 7, wherein the memory state data are exposed in a hypervisor hosting the virtual machine by dumping the memory, migrating the memory to file, snapshotting the memory, or remote direct memory access.

16. A method, in a data processing system, for monitoring a virtual machine (VM) in a distributed computing system, the method comprising:

receiving, by a monitoring broker executing on at least one processor of the data processing system, exposed disk and memory state data of the virtual machine as an out-of-band data stream via an out-of-band path comprising attach logic within a hypervisor executing on the at least one processor within the distributed computing system and hosting the virtual machine;

receiving, by the monitoring broker, an in-band data stream from the virtual machine via an in-band path comprising a software agent executing within the virtual machine on the at least one processor within the distributed computing system;

normalizing, by the monitoring broker, the in-band data stream and the out-of-band data stream to a common format;

determining, by the monitoring broker, the monitoring data stream, selected between the in-band data stream and the out-of-band data stream, to forward to a monitoring endpoint within the distributed computing system;

forwarding the monitoring data stream from the monitoring broker to the monitoring endpoint;

using the out-of-band data stream to monitor a footprint of the in-band path; and responsive to determining a failure of the in-band path based on the footprint of the in-band path, selecting the out-of-band data stream to forward to the monitoring endpoint and alerting the monitoring endpoint to revive the in-band path.

17. The method of claim 16, wherein the disk state data are represented as a file on the hypervisor filesystem, a direct-mapped local or remote block device, or a virtual disk format.

18. The method of claim 16, wherein the attach logic creates a local block device wrapper or network attached device wrapper around the disk.

19. The method of claim 16, wherein the memory state data are exposed in a hypervisor hosting the virtual machine by dumping the memory, migrating the memory to file, snapshotting the memory, or remote direct memory access.

20. The method of claim 16, further comprising interpreting logical information from the exposed disk and memory state data, parsing the logical information to extract related system or log information, and translating the system or log information to a standard format expected by the monitoring endpoint.

21. The method of claim 20, wherein interpreting logical information from the exposed disk and memory state data comprises mounting a filesystem of the disk, inspecting blocks of the disk to discover file-level information, mapping well-known operating data structures on an address space of the memory, or using heuristics to discover data structures in the memory.

22. The method of claim 16, wherein determining the monitoring data stream comprises:

responsive to the in-band-data stream and the out-of-band data stream being substantially equivalent, selecting an earliest received data stream between the in-band data stream and the out-of-band data stream.

23. The method of claim 16, wherein determining the monitoring data stream comprises:

responsive to a given data stream between the in-band data stream and the out-of-band data stream being more feature rich than the other, selecting the given data stream.

24. The method of claim 16, further comprising:

responsive to determining the in-band data stream and the out-of-band data stream substantially deviate, alerting a security solution of a potential compromise of the in-band path and quarantining the virtual machine.

\* \* \* \* \*